A. D. FOOTE.
Improvement in Apparatus for the Manufacture of Asphalt-Pavements.
No. 130,289. Patented Aug. 6, 1872.
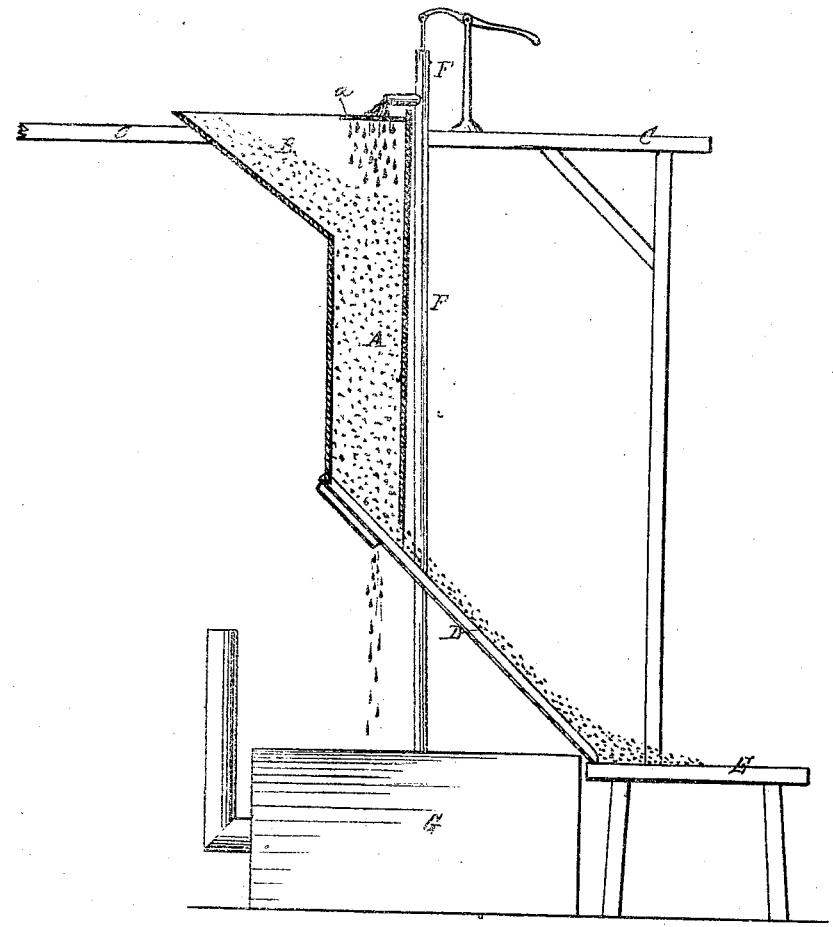
Witnesses
Inventor.
Arthur D. Foote
by atty Pollok

UNITED STATES PATENT OFFICE.

ARTHUR D. FOOTE, OF GUILFORD, CONNECTICUT.

IMPROVEMENT IN APPARATUS FOR THE MANUFACTURE OF ASPHALT PAVEMENTS.

Specification forming part of Letters Patent No. 130,289, dated August 6, 1872.

*To whom it may concern:*

Be it known that I, ARTHUR D. FOOTE, of Guilford, New Haven county, Connecticut, temporarily residing in Washington city, District of Columbia, have invented certain new and useful improvements in the method of and apparatus for mixing broken stone and gravel with composition in forming concrete, of which the following is a specification:

This invention is especially designed with a view to mix together the broken stone and tar composition which generally constitute the second course or "binder" in laying concrete pavements; but it may also be used in any other suitable connection.

The principal features which characterize this invention are, first, the mixing together broken stone or gravel and liquid composition by discharging the liquid upon a column of the stone descending through a suitable chute or box, in and by its passage through which the stone becomes coated and mixed with the composition; second, combining with the stone-chute an inclined sieve or grating, which conducts to a suitable platform the stone as it falls from the chute, and permits the escape or passage through it of the excess of liquid composition, which may be returned by suitable means, as hereinafter described, to the tar or heating kettle; third, a mixing apparatus, composed of a stone-chute, through which the stone falls, and from which it is conducted to a suitable platform, and a pump or its equivalent, connected with the liquid-composition receptacle and arranged to discharge the liquid upon the stone descending through the chute, so that by keeping the pump in motion and the stone-chute or hopper supplied with stone a continuous stream of the mixed stone and composition may be caused to be discharged from said chute, substantially as hereinafter described.

The accompanying drawing represents a side elevation, partly in section, of an apparatus adapted to carry my invention into effect.

A is an upright box or chute of suitable material and dimensions—say six feet long and one foot in diameter. A chute of this size will answer well for the purpose, although the dimensions may be varied considerably. A hopper, B, is formed on or attached to the upper end of the chute for the purpose of facilitating the delivery or discharge of the stone into the chute. The stone can be supplied either by shoveling it in or by supplying it from boxes raised and lowered by derricks or other suitable means. A platform, C, can be formed around the top of the apparatus for accommodating the workmen. Under the lower end of the chute is placed an inclined sieve or grating, D, the meshes or holes in which should be small enough to prevent the stone from falling through. This sieve should be about six feet long, and should be inclined at an angle of, say, forty-five degrees, although these proportions may be changed. The lower end of the sieve rests on the platform E, from which the mixture can be shoveled into the carts.

If the hopper B be kept supplied with stone a continuous stream of this material will find its way through the chute A and over the sieve D to the platform E. To effect the intermingling of the tar or other liquid composition with the stone, so that by the time it reaches the platform E it will have formed with the liquid the proper mixture, I pour into the chute the liquid so that it shall fall therethrough with the stone, the mixture of the two being effected by and taking place during their downward movement through the chute. The liquid may be supplied to the chute in any convenient way; but I prefer to use for the purpose a pump, F, or its equivalent, communicating at the bottom with the tar-kettle G, and discharging the liquid drawn up by it into the top of the chute. To distribute and divide up properly the liquid stream ejected from the pump-spout I arrange under the latter a perforated plate, *a*, upon which the liquid falls, and through which it passes in small streams, as shown.

The excess of liquid over that needed for the stone descends through the chute upon the sieve, through which it falls back into the kettle, to be there reheated and again drawn up by the pump and discharged upon the stone. Instead of placing the kettle under the sieve it may be placed to one side, and the tar can be caught by one or more inclined shelves or troughs as it falls through the sieve, and thus conducted back to the kettle.

The apparatus may be constructed of any suitable materials, and the arrangement of the parts may be greatly varied without departure from the principle of my invention. I have not thought it necessary to represent the supports or frame-work which uphold the apparatus. Any mechanic will understand how such a frame-work should be made and applied.

Having now described my invention and the manner in which the same is or may be carried into effect, what I claim, and desire to secure by Letters Patent, is—

1. The method of mixing broken stone and gravel with liquid composition by discharging the liquid upon a column or stream of stone descending through a suitable chute or box, in and by its passage through which the stone becomes coated and mixed with the composition, substantially as described.

2. The combination, with the chute, of an inclined sieve or grating, which conducts to a suitable platform the stone as it falls from the chute, and allows the excess of liquid composition to drain off from the same, as set forth.

3. In combination with the chute and inclined sieve or grating, one or more inclined shelves or troughs for catching the liquid composition which drops through the sieve and returning it to the kettle, substantially as set forth.

4. A mixing apparatus composed of a chute, through which the stone falls, and from which it is delivered upon a suitable platform, and a pump, arranged to draw the liquid from the composition kettle or receptacle and discharge it into the chute upon the stone descending therethrough, substantially as set forth.

In testimony whereof I have signed my name to this specification before two subscribing witnesses.

ARTHUR D. FOOTE.

Witnesses:
   EDM. F. BROWN,
   M. BAILEY.